Patented July 7, 1953

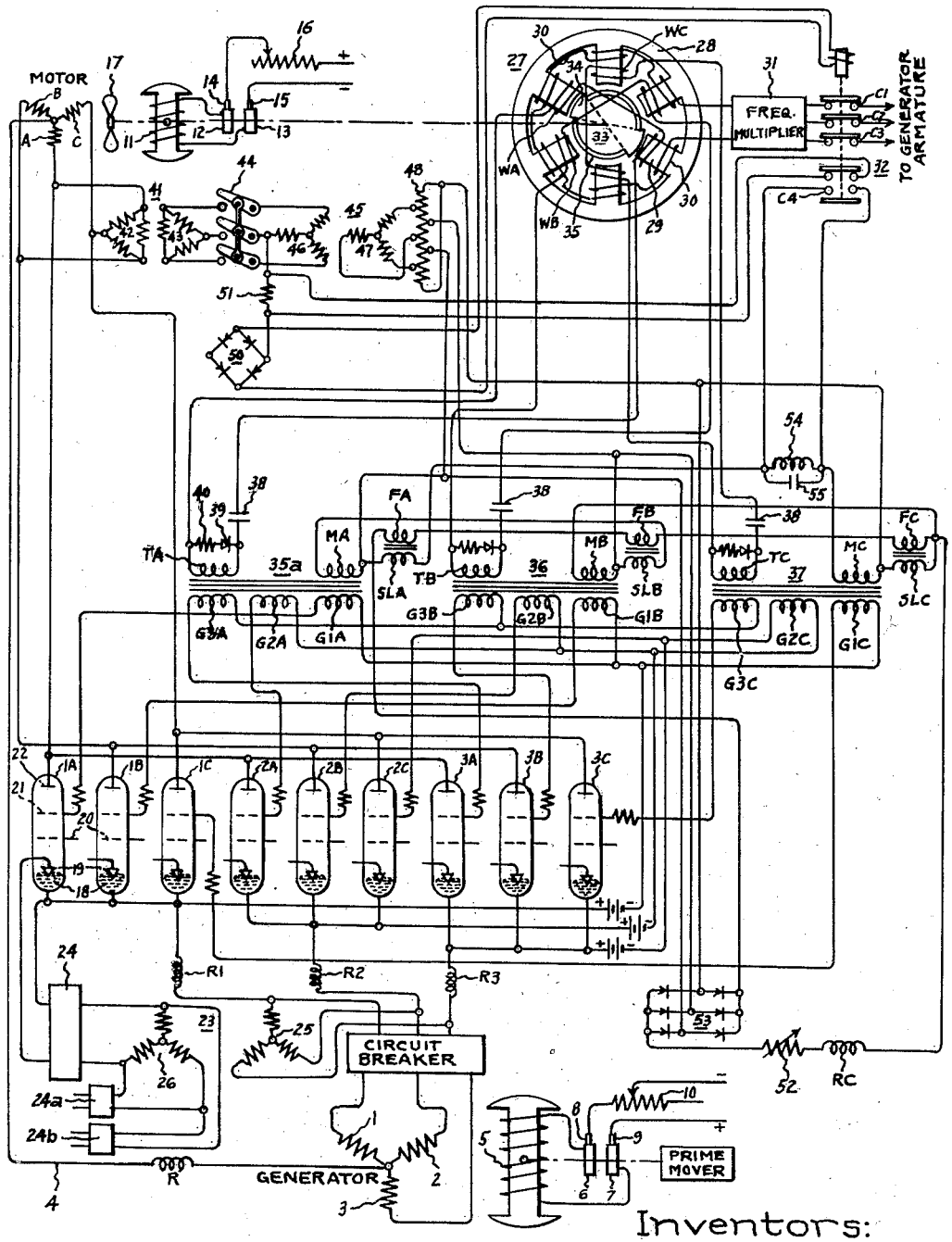

2,644,916

UNITED STATES PATENT OFFICE 2,644,916

ELECTRONIC MOTOR AND COMMUTATING MEANS THEREFOR

Ernst F. W. Alexanderson and Samuel P. Nixdorff, Schenectady, N. Y., assignors to General Electric Company, a corporation of New York Application February 6, 1951, Serial No. 209,646

9 Claims. (Cl. 318—138)

This invention relates to electronic motors and commutating means therefor and more particularly to an electronic arrangement for operating a synchronous type electric motor at variable speed from a substantially constant frequency source of power. The invention is particularly adapted for use as a means of propelling large sea-going vessels.

In large ships, it is desirable to operate the prime mover at some constant speed at which good efficiency is obtainable. Furthermore, a constant speed source of electric power is suitable as a means for supplying energy to auxiliary electric equipment such as refrigerators, lamps and the like. Changing operating conditions to be encountered require that a ship's propellers be driven at widely varying speeds which can be controlled in such a way that speed changes are effected smoothly and without causing sudden surges of power to be drawn from the prime mover.

In Reissue Patent 20,364, Alexanderson, reissued May 18, 1937, and assigned to the assignee of the present invention, an arrangement is disclosed wherein a synchronous type electric motor is driven at variable speed from a substantially constant frequency source of power. It is necessary however, in this arrangement to use moving contacts or brushes which are subject to characteristic disadvantages such as wear and the accumulation thereon of foreign substances which interfere with proper operation.

One object of this invention is to provide an improved electronic motor which is arranged to be energized from a substantial constant frequency source of energy and which is adapted for operation at widely varying speeds and in which brushes or other moving contacts are not necessary.

Another object of this invention is the provision of a signal distribution arrangement which operates on induction principles to supply a control signal to a plurality of electronic devices in a predetermined sequence so as to avoid the use of brushes or moving contacts.

According to the invention, means including magnetic commutating means having movable magnetic structure driven by the motor and operating on induction principles is used to control the tubes comprising the translating apparatus in a predetermined sequence for low motor speeds. At higher motor speeds, means responsive to the counterelectromotive force of the motor is effective to control the translating apparatus, and automatic means effects a transfer of control of the translating apparatus from the magnetic commutating means to the means responsive to the counterelectromotive force of the motor as the speed is increased and vice-versa as the speed is decreased. Since the magnetic commutating means supplies a single phase control signal at a frequency which is high relative to the multiphase counterelectromotive control means, frequency responsive means are utilized according to the invention to insure that at low speeds of the motor when the magnetic commutator is in control, the high frequency signal produced by the magnetic commutator is effective to control only one phase of the multiphase counterelectromotive control means so as to insure proper operation at low speeds. For high speeds of the motor which are controlled by the counterelectromotive force means, frequency responsive means is provided for preventing the magnetic commutating means from interfering with the operation of the counterelectromotive means. In addition, means are provided for maintaining substantially constant reactance of the control means irrespective of frequency changes due to speed changes of the motor thereby to prevent undesired phase shifts of the grids of the ignitrons.

The invention will be better understood by reference to the following description taken in conjunction with the accompanying drawing in which the single figure thereof represents schematically an electronic motor embodying the principles of the invention. The arrangement shown in the drawing comprises a nine-tube system, but it will be understood that a different number of tubes could be used. A more practical arrangement would use eighteen tubes.

Referring to the drawing, the generator is represented as a three-phase device having phase windings 1, 2 and 3. Phase 1 of the generator is connected through a suitable circuit breaker, through a suitable reactor R1, and through tubes 1A, 1B and 1C with the respective phase windings A, B and C of the motor. The neutral points of the Y-connected motor and generator armature windings are interconnected by means of conductor 4 and reactor R. Phase winding 2 of the generator is connected through the circuit breaker, reactor R2 and through tubes 2A, 2B and 2C to the motor windings A, B and C. Similarly, phase winding 3 is connected through the circuit breaker, reactor R3, tubes 3A, 3B and 3C with the motor windings. The generator is represented schematically as being of the synchronous type in which a rotatable field winding 5 is energized through slip rings 6 and 7, brushes 8 and 9, and variable resistor 10 from a suitable source of direct current energy. As is indicated on the drawing, the rotor of the generator is connected with a suitable prime mover such as a turbine.

The motor is also represented as being of the synchronous type in which a rotatable field winding 11 is energized through slip rings 12 and 13, brushes 14 and 15, and rheostat 16 from a suitable source of direct current energy. Load for the motor is represented schematically by the propeller 17.

The tubes, such as 1A, could be any suitable type. As illustrated, these tubes are of the type in which a mercury pool cathode 18 is utilized and preferably should utilize insulated cathodes. Immersed in the mercury pool of each valve is an ignitor element 19. Each valve is provided with an auxiliary or holding anode 20, a grid 21 and a plate member 22. As is well known in connection with tubes of this type, a cathode spot is established on the surface of the mercury pool cathode 18 when electric energy is supplied to the ignitors 19. This cathode spot may be maintained for a desired interval by means of the auxiliary or holding anode 20 of suitable polarity for this purpose. Control of the tubes may be obtained by suitable signals supplied to the grids 21 and by advancing or retarding the ignitor phase position as is well known.

For the purpose of energizing the ignitors 19, energy is drawn from the terminals of the generator and is fed through a throttle selsyn such as is indicated at 23 and through an ignitor firing circuit 24 to the ignitor elements 19 of tubes 1A, 1B and 1C. Selsyn 23 comprises a stationary three-phase winding 25 and an adjustable winding 26, movement of which relative to winding 25 effects a desired change in the condition of firing circuit 24 and in the angle of advance or retard of the ignitors 19 of tubes 1A, 1B and 1C with respect to the cathode-to-plate voltage of these tubes. Firing circuit 24 could be any known arrangement such as is disclosed, for example, in Patent 2,351,062, Mittag, assigned to the assignee of this invention. The ignitors 19 of tubes 2A, 2B and 2C could be energized from the throttle device 23 through a schematically represented firing circuit 24a while the ignitors 19 of tubes 3A, 3B and 3C could be energized from a firing circuit 24b. Firing circuits 24a and 24b could be energized from the remaining phase windings of secondary winding 26 not used to energize firing circuit 24 and the outputs of firing circuit 24a and 24b would be connected to energize the ignitors 19 of tubes 2A, 2B and 2C and of tubes 3A, 3B and 3C in a manner identical to the connection for the ignitors of tubes 1A, 1B and 1C.

For the purpose of energizing the grids 21 of the valves so as to control the operation thereof in the proper sequence, the magnetic commutator or distributor generally designated by the numeral 27 is used instead of brushes or contacts which were characteristic of the prior art. Commutator 27 as illustrated is provided with a stationary magnetic structure 28 having six projections 29. It will be understood that the number of poles of rotor 11 of the motor must be correct for a given magnetic commutator. An actual embodiment of the invention uses a twelve-pole motor with a commutator constructed substantially as shown on the drawing, the gear ratio of the coupling between the motor and commutator shafts being such that the speed of rotation of the commutator is 150% of the speed of rotation of the motor. The particular commutator shown is for use in a nine-tube arrangement as shown. For an eighteen-tube motor, another commutator such as 27 would be required to control the second group of nine tubes and the additional commutator would be arranged so that its signals would be displaced 180 electrical degrees from the signals of commutator 27. A primary winding 30 is wound on the projections 29 in such a way that the inwardly extending end portions of each pair of oppositely disposed poles will be opposite in polarity. Inductively associated with the primary winding 30 are a plurality of secondary windings such as WA, WB and WC. Thus, the secondary windings are energized by transformer action, the winding 30 acting as the primary winding of the transformer. Primary winding 30 is energized through a frequency multiplier 31 of known type and through the contacts C-1, C-2 and C-3 of the relay generally designated by the numeral 32 from the generator. Preferably the frequency multiplier should be arranged so as to produce a frequency approximately triple the frequency of the generator comprising phase windings 1, 2 and 3. Thus, if the generator operates so as to deliver 60 cycle frequency, the output to the primary winding 30 from the frequency multiplier preferably should be 180 cycles.

As a means for causing variations in the voltage induced in the secondary windings such as WA, WB and WC, the movable magnetic structure 33 is used. Structure 33 is indicated as being rotatable and is mechanically coupled to the schematically represented shaft which is also mechanically coupled with the rotor of the motor. Rotatable magnetic structure 33 is generally cylindrical in shape and is provided with a pair of projecting ridge portions 34 which, when disposed opposite a particular pair of diametrically oppositely disposed pole pieces, effect a reduction in the air gap between such pairs of poles and the rotatable magnetic structure. Obviously such a reduction of the air gaps tends to reduce the total reluctance of the magnetic structure comprising the stationary member 28, the particular pair of projections or poles, and of the rotatable magnetic structure 33. Such a reduction in the reluctance of the magnetic circuit for a particular pair of poles has the effect of increasing the total flux linkages and thereby tends to increase the magnitude of voltage induced in the particular secondary winding such as WA, for example, which would be the winding affected for the particular position of structure 33 illustrated. The cylindrical surfaces of the magnetic rotor 33 are also provided with a non-magnetic material such as brass which is positioned on the rotatable element 33 as is indicated by the numeral 35. As will be seen from the drawing, the non-magnetic structures 35 are formed to conform with the cylindrical surfaces of the structure 33 and their purpose is to increase the reluctance of the magnetic circuit for oppositely disposed pairs of the poles 29 which at a particular instant do not happen to be adjacent the ridge portions 34 of the rotatable element 33.

From the above description of the magnetic commutator 27, it will be apparent that rotation of the motor causes rotation of magnetic element 33 which in turn causes an increase in the voltage output from one of the secondary windings of the device whenever the ridge portions 34 of the rotatable element 33 are disposed adjacent a particular pair of cooperating poles. In effect, the commutator 27 acts as a distributor and alternately energizes first one and then another of the secondary windings in sequence.

The terminals of the secondary winding WA of commutator 27 are connected with the primary winding TA of the grid transformer generally designated by the numeral 35a. Likewise, the grid transformer generally designated by the numeral 36 is provided with a primary winding TB which is energized from the winding WB of device 27. In identical manner, the grid transformer generally designated by the numeral 37 is provided with the winding TC which is energized by the winding WC of device 27. In series with the primary winding TA of transformer 35a and with its source of energy is a capacitor 38 which is constructed so that the circuit impedance at 180 cycles is relatively low but so that the circuit impedance is relatively high at the frequency of the motor voltage. For the purpose of allowing a predetermined half wave of the 180 cycle output from winding WA to by-pass winding TA, a rectifier 39 and a resistor 40 are connected directly across the terminals of the winding TA. In a manner identical to that just described, the windings TB and TC are arranged in series with a capacitor 38 which performs as does the capacitor 38 associated with winding TA. In the same manner as with winding TA, the windings TB and TC are provided with a rectifier and a resistor, arranged as described in connection with transformer TA.

The grid transformer generally designated by the numeral 35a is provided with a plurality of secondary windings G1A, G2A and G3A. These secondary windings are connected so as to supply a control signal to the appropriate grid 21 of the ignitrons. For example, winding G3A supplies a control signal to the grid of ignitron 3A while winding G2A supplies a signal to the winding of ignitron 2A. Winding G1A is likewise connected to supply a signal to the grid of ignitron 1A.

From the description thus far, it will be obvious that for the particular rotor position of magnetic structure 33 of magnetic commutator 27 a signal would be supplied to the grids of ignitrons 1A, 2A and 3A so that at this particular instant a phase winding such as A of the motor would be energized. Assuming counterclockwise rotation of rotor 33, the winding WB would subsequently receive an increased voltage and in turn through grid transformer 36 would supply a control signal to the grids 21 of ignitrons 1B, 2B and 3B to energize phase winding B of the motor. In like manner, the secondary winding WC of device 27 would thereafter energize the grids 21 of ignitrons 1C, 2C and 3C through the agency of the grid transformer generally designated by the numeral 37 and would in turn energize the phase winding C of the motor.

As the motor increases in speed, its counter-electromotive force increases to such an extent that the terminal voltage of the machine is sufficient to effect control of the ignitrons.

According to another aspect of the invention, control of the grids is transferred from the magnetic device 27 to the terminals of the motor by automatic means responsive to the motor voltage and effective to energize another primary winding of each of the grid transformers 35a, 36 and 37.

As will be observed from the drawing, a transformer 41 having a primary winding 42 and a secondary winding 43 is energized from the motor terminals. Output of winding 43 is fed through a switch 44 to one winding of phase shifting device 45. Phase shifter 45 like phase shift device 23 is provided with a primary winding 46 and a secondary winding 47. Output of secondary winding 47 is supplied to autotransformer 48 which in turn supplies energy to another primary winding such as MA, MB and MC which are respectively associated with grid transformers 35a, 36 and 37. Since capacitors 38 afford high reactance to the relatively low motor frequency supplied to windings MA, MB and MC, the effect of this frequency is not sufficient to interfere with the proper functioning of the primary windings TA, TB and TC, which, as already explained, are energized from the device 27 for low motor speeds.

For the purpose of effecting a changeover of control from the device 27 to the counterelectromotive force of the motor, a rectifier 50 is arranged to be energized through a resistor 51 from the output of the secondary winding 43 of transformer 41. Output from rectifier 50 is supplied to the operating winding of relay 32. Thus, when the motor speed reaches a sufficient predetermined value, the voltage output of rectifier 50 is sufficient operably to energize the coil of relay 32, thus causing that relay to open its normally closed contacts C–1, C–2 and C–3, which operation deenergizes the frequency multiplier 31 and causes deenergization of the primary winding 30 of magnetic commutator 27. Resistor 51 is so constructed that upon a decrease in the speed of the motor the voltage at which the relay 32 drops out is substantially the same as the voltage for which that relay picks up as the motor speed is increased. It will be understood, of course, that after control is shifted from device 27 to the motor terminals as the speed is increased, the secondary windings of the grid transformers 35a, 36 and 37 function to control the grids of their respective ignitrons in a manner similar to that already described above. If the generator frequency is 60 cycles, transfer of control as described above from the magnetic commutator 27 to the motor terminals would be effected at some intermediate frequency between motor standstill and 60 cycles such as 20 cycles, for example.

For proper operation, the phase relationship of the grid voltage of the ignitrons should remain fixed with respect to the terminal voltage of the motor as the motor frequency varies from some value such as 20 cycles to some other value such as 50 cycles.

In order to prevent undesired phase shift of the grids with respect to the motor terminal voltage due to changes in frequency supplied to the primary windings MA, MB and MC, a saturable reactor is arranged in series with each of these primary windings and suitable control means are provided for each saturable reactor which effects a change in the reactance thereof so as to compensate for changes in the reactance of the primary windings MA, MB and MC due to frequency changes. From the drawing, it will be observed that a saturable reactor SLA is interconnected with winding MA and that saturable reactor SLB is arranged in series with the winding MB and that the saturable reactor SLC is arranged in series with the winding MC. These saturable reactors are provided with control windings FA, FB and FC which are respectively associated with the saturable reactors. A control current which varies in magnitude with variations in the voltage at the motor terminals is supplied to the windings FA, FB and FC through a reactor RC and through resistor 52 and rectifier arrangement 53 which is energized from the output of autotransformer 48. Preferably resistor 52 should be of the non-linear type.

From the drawing, it will be observed that the windings MA, MB and MC, together with the saturable reactors SLA, SLB and SLC, are arranged in a closed delta circuit and that energy from the output terminals of autotransformer 48 is supplied to the junction point between each primary winding such as MA and its associated saturable reactor such as SLA. Since an increase in the inductance of the windings such as MA due to an increase in motor speed and frequency will be offset by a decrease in the reactance of the saturable reactor such as SLA due to the action of the various control windings energized from rectifier 53, the resultant reactance of this delta circuit remains substantially constant in accordance with one aspect in the invention so that undesired phase shifts are avoided. Furthermore, the direct current from rectifier 53 tends to cause grid transformers to produce peaked wave shapes of voltage and hence improves the accuracy of grid firing.

As just explained, the primary windings MA, MB and MC together with associated saturable reactors are arranged in series as a closed delta circuit. During the starting period when a signal is supplied to one of the primary windings such as TA from the magnetic commutator 27, a winding such as MA, MB and MC would tend to act as secondary windings. For example, when a winding such as TA is energized, a signal would be induced in winding MA which in turn would tend to cause a circulating current to flow in the winding MB and in the winding MC which conceivably could transmit a signal to all the ignitrons simultaneously. In order to prevent such a condition from arising, a trap circuit is incorporated in series with the closed delta circuit described above. This trap circuit comprises a reactor 54 and a capacitor 55. These elements would be so chosen that 180 cycle voltage from the magnetic commutator would not be transmitted through the trap. In this way, only the primary winding of the particular grid transformer would be energized to cause operation of the proper tube.

Arranged in shunt circuit relationship to the trap circuit comprising the reactor 54 and capacitor 55 is a pair of contacts C-4 of relay 32. Since contacts C-4 are normally open, the trap circuit is effective during the starting period before the relay is operated. After the relay operates, the trap circuit is short circuited and hence is not capable of interfering with the operation of the motor from the counterelectromotive force drawn from its terminals.

In an actual embodiment of the invention, it was found that a negative grid bias such as is indicated schematically by batteries was overcome during the starting period by the signals received from the magnetic commutator but that after control was shifted to the terminals of the motor the negative bias was not desirable. While an actual embodiment of the invention probably would use rectifiers and a source of alternating current as a means for producing the grid bias, this equipment being well known is not shown in the drawing. The relay 32 could be provided with additional contacts for removing the grid bias when control of the motor is shifted to the counterelectromotive means.

The speed of the motor may be controlled by varying either the motor field excitation or the generator field excitation or by varying the generated voltage in any other suitable way since the motor operates in a manner similar to the operation of a direct current motor. Speed changes may also be effected by effecting a phase shift through the agency of the phase shift circuits such as 24. Speed changes may also be effected by means of the throttle selsyn 23 or by means of the motor selsyn 45, although generally it is desirable to use the motor selsyn 45 only as an adjustment for optimum power factor conditions and thereafter to leave the motor selsyn so adjusted.

While a particular embodiment of the invention has been shown and described, it will be obvious to those skilled in the art that various changes and modifications may be made without departing from the invention in its broader aspects, and it is therefore intended in the appended claims to cover all such changes and modifications as fall within the true spirit and scope of the invention.

What we claim as new and desire to secure by Letters Patent of the United States is:

1. In combination, a motor having a plurality of windings, a plurality of electronic devices respectively connected with said windings, each device having a control element, control means for operably energizing said devices in a predetermined sequence including a magnetic structure, a primary winding and a plurality of secondary windings wound on said magnetic structure, said secondary windings being displaced from each other, means for supplying a relatively high frequency current to said primary winding, magnetic control means movable in accordance with rotation of said motor and with respect to said secondary windings so as to vary the magnitude of voltage respectively induced in said secondary windings, circuit means interconnecting each of said secondary windings with certain of said control elements, means for supplying a control signal to said control elements which is dependent upon the motor voltage, means for preventing interference with the signal supplied to said control elements from said secondary windings by said control signal dependent upon motor voltage, and automatic means responsive to the speed of the motor for rendering said secondary windings ineffective to control the energization of said control elements.

2. In combination, a motor having a plurality of windings, a plurality of electronic devices respectively connected with said windings, each of said devices having a control element, control means for operably energizing said control elements in a predetermined sequence including a magnetic distributor for producing recurring signals each of relatively high frequency, circuit means for respectively supplying said signals to said control elements, means for deriving a signal dependent upon the motor voltage and for supplying said signal to said control elements through said circuit means, and impedance means interconnected between said distributor and said circuit means, said impedance means having low impedance to said high frequency signals and high impedance to the frequency of the motor voltage so as to prevent interference with the signals produced by said distributor by the signals derived from motor voltage.

3. In combination, a motor having a plurality of windings, a plurality of electronic devices respectively connected with said windings, each of said devices having a control element, control means for operably energizing said control elements in a predetermined sequence including a magnetic distributor for producing recurring signals each of relatively high frequency, circuit means for respectively supplying said signals to said control elements, means for deriving a signal dependent upon the motor voltage and for supplying said signal to said control elements through said circuit means, impedance means interconnected between said distributor and said circuit means, said impedance means having low impedance to said high frequency signals and high impedance to the frequency of the motor voltage so as to prevent interference with the signals produced by said distributor by the signals derived from motor voltage, and means responsive to motor voltage for rendering said magnetic distributor ineffective to control said devices for motor speeds in excess of a predetermined value.

4. In combination, an electronic device arranged to control the flow of current to one phase winding of an electric motor, a control electrode for said device, a transformer having a secondary winding arranged to control the energization of said control electrode and having a primary winding energized from the motor voltage, a saturable reactor in series with said primary winding and the motor voltage, and a control winding for said saturable reactor, said control winding being energized in accordance with the motor voltage.

5. In combination, an electronic device arranged to control the flow of current to one phase winding of an electric motor, a control electrode for said device, a transformer having a secondary winding arranged to control the energization of said control electrode and having a primary winding energized from the motor voltage, a saturable reactor in series with said primary winding and the motor voltage, a control winding for said saturable reactance, said control winding being energized in accordance with the motor voltage, and a non-linear impedance device in series with the motor voltage and said control winding.

6. In combination, an electronic device arranged to control the flow of current to one phase winding of an electric motor, a control electrode for said device, a transformer having a secondary winding arranged to control the energization of said control electrode and having a first primary winding energized from the motor voltage, a saturable reactor in series with said primary winding and the motor voltage, a control winding for said saturable reactor, said control winding being energized in accordance with the motor voltage, a second primary winding for said transformer, means for supplying a relatively high frequency signal to said second primary winding, and impedance means in series with said second winding having low impedance to said high frequency signal and high impedance to the frequency of the motor voltage.

7. In combination, an electronic device arranged to control the flow of current to one phase winding of an electric motor, a control electrode for said device, a transformer having a secondary winding arranged to control the energization of said control electrode and having a first primary winding energized from the motor voltage, a saturable reactor in series with said primary winding and the motor voltage, a control winding for said saturable reactor, said control winding being energized in accordance with the motor voltage, a second primary winding for said transformer, means for supplying a relatively high frequency signal to said second primary winding, impedance means in series with said second winding having low impedance to said high frequency signal and high impedance to the frequency of the motor voltage, and impedance means in series with said first winding having high impedance to the frequency supplied to said second primary winding and low impedance to the frequency of the motor voltage.

8. In combination, an electronic device arranged to control the flow of current to one phase winding of an electric motor, a control electrode for said device, a transformer having a secondary winding arranged to control the energization of said control electrode and having a first primary winding energized from the motor voltage, a saturable reactor in series with said primary winding and the motor voltage, a control winding for said saturable reactor, said control winding being energized in accordance with the motor voltage, a second primary winding for said transformer, means for supplying a relatively high frequency signal to said second primary winding, impedance means in series with said second winding having low impedance to said high frequency signal and high impedance to the frequency of the motor voltage, impedance means in series with said first winding having high impedance to the frequency supplied to said second primary winding and low impedance to the frequency of the motor voltage, and automatic means responsive to values of motor voltage in excess of a predetermined value for de-energizing said second winding and for shunting the impedance means in series with said first winding.

9. In combination, an electronic device arranged to control the flow of current to one phase winding of an electric motor, a control electrode for said device, a transformer having a secondary winding arranged to control the energization of said control electrode and having a first primary winding energized from the motor voltage, a second primary winding for said transformer, means for supplying a relatively high frequency signal to said second primary winding, impedance means in series with said second winding having low impedance to said high frequency signal and high impedance to the frequency of the motor voltage, and impedance means in series with said first winding having high impedance to the frequency supplied to said second primary winding and low impedance to the frequency of the motor voltage.

ERNST F. W. ALEXANDERSON.
SAMUEL P. NIXDORFF.

References Cited in the file of this patent

UNITED STATES PATENTS

| Number | Name | Date |
|---|---|---|
| Re. 20,364 | Alexanderson | May 18, 1937 |
| 1,971,188 | Kramer | Aug. 21, 1934 |
| 2,122,271 | Alexanderson | June 28, 1938 |
| 2,231,271 | Journeaux | Feb. 11, 1941 |
| 2,488,734 | Mueller | Nov. 22, 1949 |